(12) United States Patent
Harley (10) Patent No.: US 7,701,440 B2
(45) Date of Patent: Apr. 20, 2010

(54) POINTING DEVICE ADAPTED FOR SMALL HANDHELD DEVICES HAVING TWO DISPLAY MODES

(75) Inventor: Jonah Harley, Mountain View, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 798 days.

(21) Appl. No.: 11/311,612

(22) Filed: Dec. 19, 2005

(65) Prior Publication Data

US 2007/0139374 A1 Jun. 21, 2007

(51) Int. Cl.
*G06F 3/033* (2006.01)

(52) U.S. Cl. ........................................ 345/157; 345/160

(58) Field of Classification Search ......... 345/156–157, 345/159–162, 169, 184; 715/800–804
See application file for complete search history.

(56) References Cited

U.S. PATENT DOCUMENTS

| | | | |
|---|---|---|---|
| 3,987,685 A | 10/1976 | Opocensky | |
| 4,670,743 A | 6/1987 | Zemke | |
| 4,719,455 A | 1/1988 | Louis | |
| 5,006,952 A | 4/1991 | Thomas | |
| 5,056,146 A | 10/1991 | Nishide | |
| 5,086,296 A | 2/1992 | Clark | |
| 5,252,952 A | 10/1993 | Frank et al. | |
| 5,263,134 A * | 11/1993 | Paal et al. | 715/788 |
| 5,421,694 A | 6/1995 | Baker et al. | |
| 5,504,502 A | 4/1996 | Arita et al. | |
| 5,515,044 A | 5/1996 | Glatt | |
| 5,615,083 A | 3/1997 | Barnett | |
| 5,659,334 A | 8/1997 | Yaniger | |
| 5,703,356 A | 12/1997 | Bidiville et al. | |
| 5,704,037 A | 12/1997 | Chen | |
| 5,739,821 A | 4/1998 | Ho | |
| 5,808,603 A | 9/1998 | Chen | |

(Continued)

FOREIGN PATENT DOCUMENTS

DE 4033465 5/1991

(Continued)

OTHER PUBLICATIONS

U.S. Appl. No. 60/794,723, filed Apr. 25, 2006, Harley.

(Continued)

*Primary Examiner*—Chanh Nguyen
*Assistant Examiner*—Long Pham (57) ABSTRACT

A display device having a puck, a display screen, and a controller is disclosed. The puck moves in a puck field of motion on a surface, the field of motion being divided into a pointing region and a function region. The controller determines a position of the puck within the field of motion. The display screen has first and second display modes, the display screen displaying a two-dimensional scene in the first display mode and a sub-scene of the two-dimensional scene in the second display mode. A cursor that moves within the sub-scene in a manner controlled by the puck position in the pointing region is displayed in the second mode. The controller causes the display scene to change between modes when the puck moves between regions. The sub-scene position moves in response to the position of the puck in the function region in the first display mode.

13 Claims, 11 Drawing Sheets

U.S. PATENT DOCUMENTS

| | | | |
|---|---|---|---|
| 5,815,139 | A | 9/1998 | Yoshikawa et al. |
| 5,874,956 | A | 2/1999 | LaHood |
| 5,883,690 | A | 3/1999 | Meyers et al. |
| 5,889,507 | A | 3/1999 | Engle et al. |
| 5,914,465 | A | 6/1999 | Allen |
| 5,949,354 | A | 9/1999 | Chang |
| 5,956,016 | A | 9/1999 | Kuenzner et al. |
| 6,115,030 | A | 9/2000 | Berstin et al. |
| 6,198,473 | B1 | 3/2001 | Armstrong |
| 6,256,012 | B1 | 7/2001 | Devolpi |
| 6,288,707 | B1 | 9/2001 | Philipp |
| 6,292,174 | B1 | 9/2001 | Mallett et al. |
| 6,326,948 | B1 | 12/2001 | Kobachi et al. |
| 6,430,023 | B1 | 8/2002 | Suzuki |
| 6,492,911 | B1 | 12/2002 | Netzer |
| 6,525,713 | B1 | 2/2003 | Soeta et al. |
| 6,530,283 | B2 | 3/2003 | Okada et al. |
| 1,072,395 | A1 | 11/2003 | Harley |
| 6,646,631 | B2 | 11/2003 | Suzuki et al. |
| 6,667,733 | B2 | 12/2003 | Miyoshi |
| 6,753,848 | B2 | 6/2004 | Toshiharu |
| 6,762,748 | B2 | 7/2004 | Maatta et al. |
| 6,816,148 | B2 | 11/2004 | Mallett et al. |
| 6,816,154 | B2 | 11/2004 | Wong et al. |
| 6,961,052 | B1 | 11/2005 | Vaziri |
| 1,407,274 | A1 | 4/2006 | Orsley |
| 7,042,441 | B2 | 5/2006 | Adams et al. |
| 7,046,230 | B2 | 5/2006 | Zadesky et al. |
| 7,123,028 | B2 | 10/2006 | Okada et al. |
| 7,158,115 | B2 | 1/2007 | Harley et al. |
| 1,923,653 | A1 | 10/2007 | Orsley |
| 1,606,556 | A1 | 11/2007 | Harley et al. |
| 2002/0163547 | A1* | 11/2002 | Abramson et al. .......... 345/855 |
| 2003/0048262 | A1 | 3/2003 | Wu et al. |
| 2003/0076301 | A1 | 4/2003 | Tsuk et al. |
| 2003/0095096 | A1 | 5/2003 | Robbin et al. |
| 2004/0108993 | A1 | 6/2004 | Suzuki et al. |
| 2005/0052425 | A1 | 3/2005 | Zadesky et al. |
| 2005/0052426 | A1 | 3/2005 | Hagermoser et al. |
| 2005/0052429 | A1 | 3/2005 | Philipp |
| 2005/0062732 | A1 | 3/2005 | Sinclair et al. |
| 2005/0110755 | A1 | 5/2005 | Harley et al. |
| 2006/0001657 | A1 | 1/2006 | Monney et al. |
| 2006/0033721 | A1 | 2/2006 | Woolley et al. |
| 2006/0038783 | A1 | 2/2006 | Shaw et al. |
| 2006/0176270 | A1 | 8/2006 | Sachs |
| 2006/0192754 | A1* | 8/2006 | Sachs et al. .................. 345/157 |
| 2006/0267933 | A1 | 11/2006 | Tai et al. |
| 2007/0052691 | A1 | 3/2007 | Zadesky et al. |
| 2007/0247421 | A1 | 10/2007 | Orsley |

FOREIGN PATENT DOCUMENTS

| | | | |
|---|---|---|---|
| DE | 10309011 | | 9/2004 |
| EP | 1136939 | | 9/2001 |
| GB | 2247938 | | 3/1992 |
| JP | 7-49325 | | 2/1995 |
| WO | WO0051358 | * | 8/2000 |
| WO | WO0203317 | * | 1/2002 |
| WO | WO-2006/031332 | | 3/2006 |

OTHER PUBLICATIONS

U.S. Appl. No. 10/723,957, filed Nov. 24, 2003, Harley.
U.S. Appl. No. 11/407,274, filed Apr. 19, 2006, Orsley.
U.S. Appl. No. 11/923,653, filed Oct. 25, 2007, Orsley.
"3M Double Coated tapes", 9731 931 RW Technical Data, Feb. 2005.
"ARS Technica, iPod nano", http://arstechnica.com/reviews/ardware/nano.ars/4,, (1998).
"Motorola SLVR", www.motorola.com/motoinfo/product/details.jsp,(unknown),2007.
Panasonic, "Panasonic Tactile Sheet Type ESP", Dec. 2005.
Avago Technologies, "AMRI- 2000 Data Sheet", Sep. 2007.
Avago Technologies, "AMRI-2000-P000 Data Sheet", Sep. 2007.

* cited by examiner

POINTING DEVICE ADAPTED FOR SMALL HANDHELD DEVICES HAVING TWO DISPLAY MODES

BACKGROUND OF THE INVENTION

Modern computer operating systems and graphics programs require a pointing device for controlling the position of a cursor on the computer display. Likewise, handheld devices such as personal information managers and cell phones would also benefit from the inclusion of such a pointing device. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate a desired cursor movement on the screen, the user simply picks up the mouse and recenters the mouse in the workspace.

While the mouse has provided a satisfactory solution to the pointing device problem in the desktop PC market, a similarly successful device is not available for hand-held devices such as cellular telephones. These devices lack a sufficiently large flat surface near the keypad or screen over which a mouse can be moved. In addition, the need to carry a separate pointing device makes the mouse less than ideal for these applications. Hence, some other form of pointing device is needed when using these devices.

A pointing device for use in these environments must solve the problem of moving a cursor quickly and accurately. In addition, the device must operate in an intuitive fashion that a novice user can comprehend without extensive instruction. In addition, the pointing device must operate in a limited workspace and fit within the form factor of the hand held device. Finally, the usual constraints of low cost, low power consumption and high reliability must also be met.

In the case of laptop computers, there are two dominant solutions to the pointing device problem in the marketplace, the Synaptics capacitive TouchPad™ and the IBM TrackPoint™. Other companies make versions of these devices with similar functionality. Both of these devices fall far short of satisfying the above requirements. The TrackPoint™ is a small button that is typically placed in the center of the laptop keyboard. The button may be moved in a manner analogous to a "joy stick" by applying a lateral force to the top of the button with a finger. Unfortunately, the button can only move a small amount; hence, the displacement of the button cannot be mapped directly into a displacement in the cursor position on the computer display. Instead, the button displacement controls the direction and speed with which the cursor moves. The accuracy with which a user can position the cursor using this type of velocity control is significantly less than that achieved with a conventional mouse. This limitation is particularly evident in tasks that require small, precise movements such as drawing in a computer graphics program. In addition, this type of pointing device does not provide the button functionality.

The TouchPad™ is a blank rectangular pad, 50 to 100 mm on a side, typically placed below the keyboard of most laptops. The device senses the position of a finger on the surface of the rectangle relative to the edges of the device. This sensing is accomplished by measuring the capacitance changes introduced by a user finger on a series of electrodes beneath an insulating, low-friction material.

Like the TrackPoint™, the TouchPad™ also suffers from lack of precision. It is inherently difficult to measure the capacitive changes introduced by the user, who is at an unknown potential relative to the circuit. Furthermore, the contact area of the user's finger is relatively large. Hence, to provide an accurate measurement of the finger position, the device must determine some parameter such as the center of the contact area between the finger and the pad. Unfortunately, the contact area varies in size and shape with the pressure applied by the user. Therefore, such determinations are, at best, of limited precision. In practice, users are unable to repeatably execute precise movements.

There are also difficulties arising from false signals when the user inadvertently touches the pad with a finger or a wrist. In some devices, the "clicking" function of a conventional mouse is implemented by tapping on the pad. As a result, such inadvertent activation during typing causes the cursor to jump to a new location in the middle of the typing operation and the text being inserted at the new location.

In previously filed U.S. patent application Ser. No.: 10/723,957, which is hereby incorporated by reference, a puck-based pointing device that overcomes many of the problems described above is taught. The pointing device utilizes a puck that moves in a defined field of motion when a user applies pressure to the puck via the user's finger. When the user releases the puck, a set of springs returns the puck to its centered position within the field of motion. The position of the puck and the pressure on the puck are determined by electrodes in the device. The position information is used to position a cursor on the display screen. Software on the attached device translates the motion of the puck during the time the user's finger is pressing on the puck into the appropriate cursor motion on the device's display. When the user releases the puck, the coupling between the puck and the cursor position is broken by the software, and hence, the cursor does not move backwards while the puck is being recentered.

The device taught in the above-described patent can be scaled down from laptop-size to fit in a variety of portable devices such as cell phones, PDAs and MP3 players. As the screen size is reduced the required puck travel can also be decreased. However, the limited screen size places a premium on other operations such as scrolling. The small screen of a handheld device such as a cell phone can emulate a small window through which a much larger desktop is viewed. By moving the window in various directions, the desired portion of the desktop can be positioned under the window. Objects on the desktop under the window can then be selected by moving the cursor within the window. Hence, a pointing device for use in such an environment would benefit from having both a pointing function and a two-dimensional scrolling function.

Figure 12:
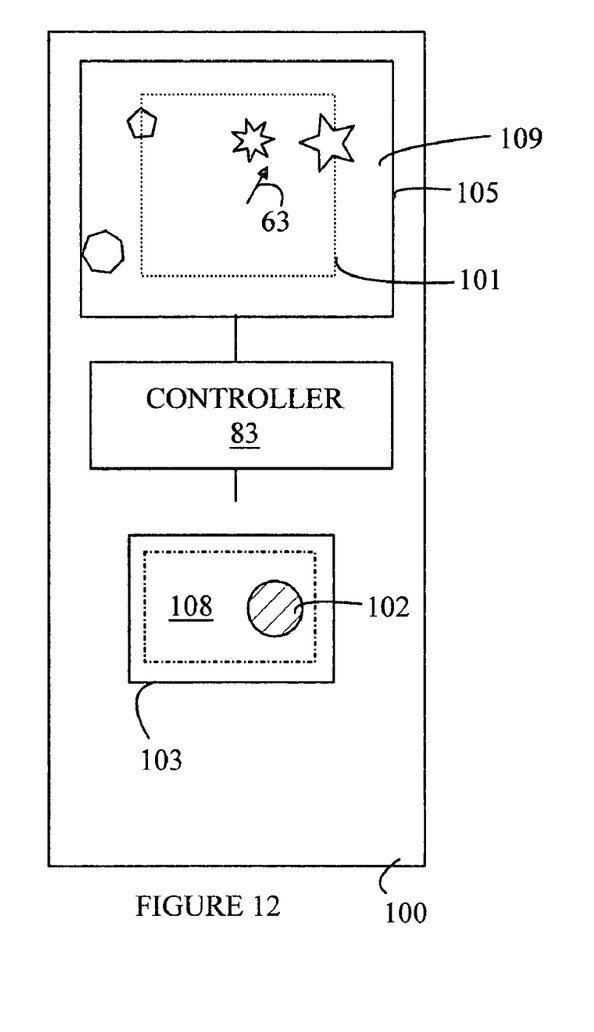

In a second co-pending application, U.S. Ser. No.: 11/069,341, a pointing device that provides both the scrolling and pointing functions is described. The disclosed invention uses the display on the handheld device to display the contents of a larger desktop under a "window" on the display of the handheld device. The location of the window is moved by moving the pointing device into a predetermined region on the edge of the field of motion of the puck. While this solution FIG. 12 illustrates a handheld device according to another embodiment of the present invention.

DETAILED DESCRIPTION OF THE PREFERRED EMBODIMENTS OF THE INVENTION

Figure 1:
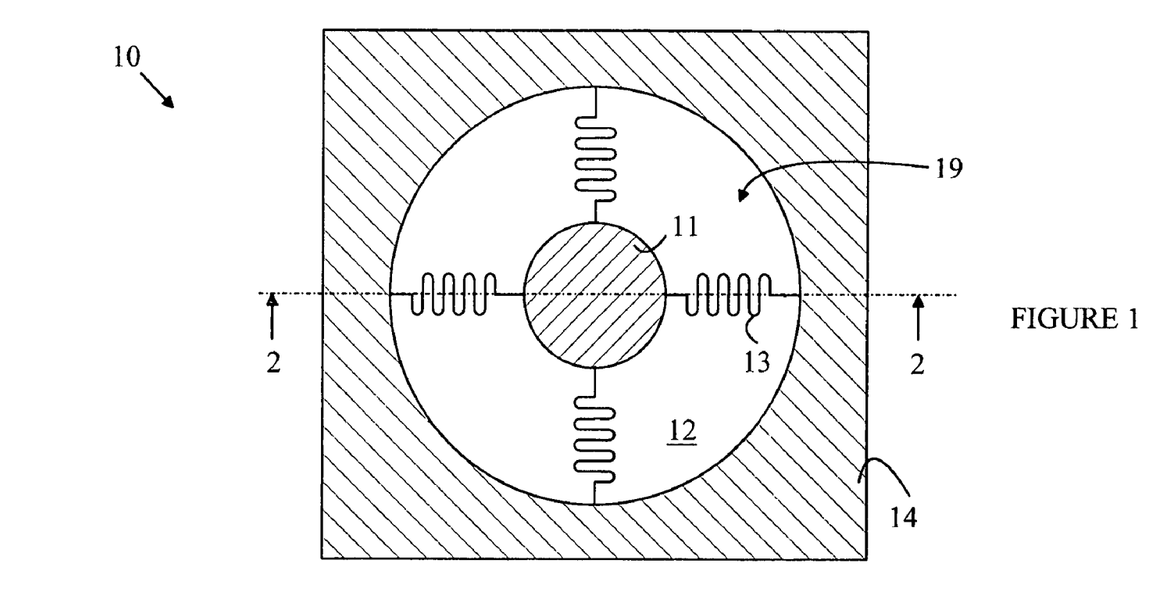
FIG. 1 is a top view of pointing device 10.
Figure 2:
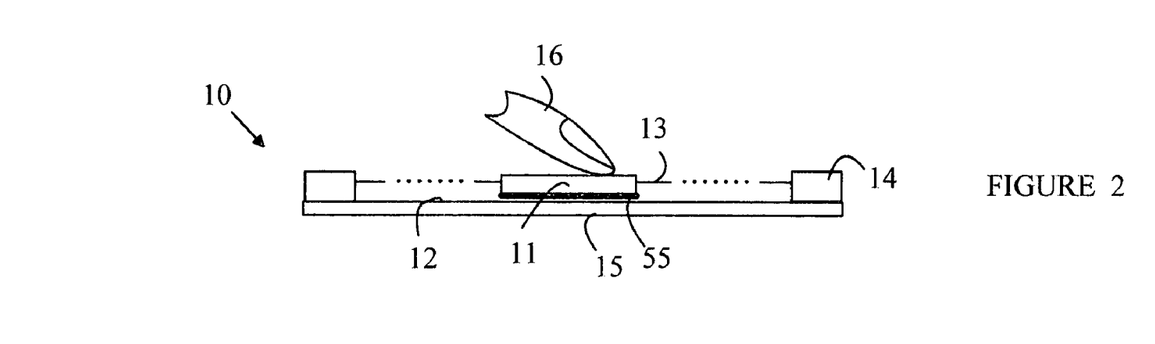
FIG. 2 is a cross-sectional view of pointing device 10 through line 2-2 shown in FIG. 1.

The manner in which the present invention provides its advantages can be more easily understood with reference to FIGS. 1 and 2, which illustrate a puck-based pointing device 10 as taught in the above-described patent applications. FIG. 1 is a top view of pointing device 10, and FIG. 2 is a cross-sectional view of pointing device 10 through line 2-2 shown in FIG. 1. Pointing device 10 includes a puck 11 that moves over a surface 12 of a substrate 15 within a puck field of motion 19 in response to a lateral force applied to puck 11. The force is typically applied to puck 11 by a user's finger. Puck 11 includes a pressure sensing mechanism that measures the vertical pressure applied to puck 11. When the sensed pressure exceeds a predetermined threshold, the cursor tracking function is activated and the cursor moves on the screen in a direction and distance determined by the motion of the puck. In addition, pointing device 10 includes a sensing mechanism for determining the position of puck 11 on surface 12.

When the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host device. That is, the cursor remains at its previous location. This provides a convenient "re-centering" capability, typically achieved on a mouse by lifting and replacing the mouse at the center of the field of motion. Re-centering is particularly necessary in laptop computers, hand-held devices and other miniature applications in which the field of motion is constrained.

The above-described patent application teaches a number of mechanisms for measuring the pressure exerted by the user on the puck, and hence, these mechanisms will not be discussed in detail here. For the purposes of this discussion, it is sufficient to note that a puck having a top surface that can move vertically relative to the bottom surface can be utilized. The top surface is held in place by a spring mechanism. When the user applies pressure to the top surface, the top surface moves toward the bottom surface by an amount that depends on the applied pressure. The distance between the top and bottom surfaces of the puck is measured utilizing one of a number of methods. For example, the top and bottom surfaces of the puck can include conducting layers that form a parallel plate capacitor. The capacitance of this capacitor depends on the distance between the plates, and hence, a measurement of the capacitance provides a measurement of the pressure applied by the user.

Figure 3:
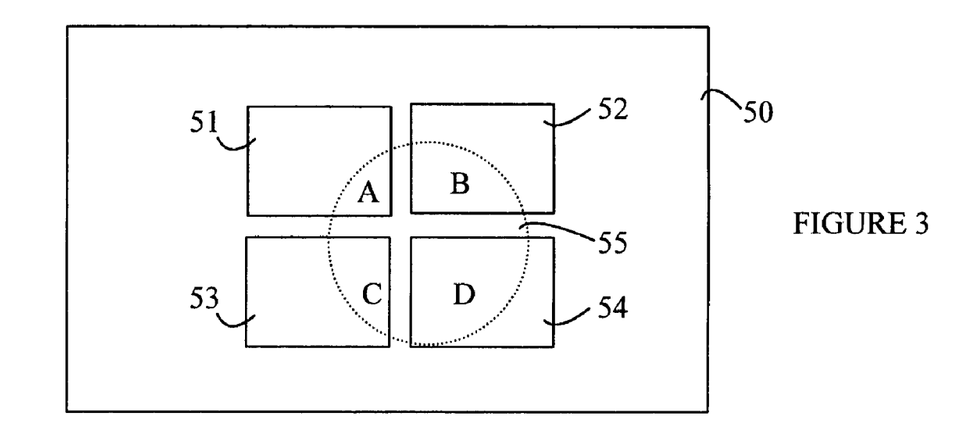
FIG. 3 is a top view of a portion of the surface shown in FIG. 1 over which the puck moves in one embodiment of the present invention.

The manner in which the position of the puck is sensed in one embodiment is described in detail in the above-identified patent application, and hence, will not be discussed in detail here. For the purposes of this discussion, it will be assumed that a capacitive sensing scheme can be utilized to determine the puck's position. Such a scheme is illustrated in FIG. 3, which is a top view of a portion of surface 12 shown in FIG. 1 over which the puck moves in one embodiment of the present invention. Surface 50 includes four electrodes shown at 51-54 having terminals that are connected to an external circuit. To simplify the drawing, these terminals have been omitted. The puck has a bottom surface that includes an electrode 55 that is shown in phantom in the drawing. Elecprovides the additional scrolling functions, the user must still remember what is on the "desktop" in the regions that are not visible in the current window.

SUMMARY OF THE INVENTION

The present invention includes a display device having a puck, a display screen, and a controller. The puck moves on a first surface that includes a puck field of motion defined thereon, the puck field of motion being divided into a pointing region and a function region. The controller determines a position of the puck within the field of motion. The display screen has first and second display modes, the display screen displaying a two-dimensional scene in the first display mode and a sub-scene of the two-dimensional scene in the second display mode. The sub-scene is characterized by a sub-scene position. The display screen displays a cursor that moves within the sub-scene in a manner controlled by the position of the puck when the puck is in the pointing region in the second mode. The controller causes the display scene to change from the second mode to the first mode when the puck is in the function region. The controller causes the sub-scene position to move in response to the position of the puck in the function region.

trodes 51-55 are electrically isolated from one another. For example, electrode 55 can be covered with a layer of dielectric that provides the required insulation while still allowing electrode 55 to slide over the other electrodes. The electrodes can in fact be patterned on the back of the substrate whose surface is shown at 50. This reduces the capacitance between the electrodes and the puck electrode, but can be practical for substrate thicknesses of a few millimeters or less. The overlap between electrode 55 and each of electrodes 51-54 depends on the position of the puck relative to electrodes 51-54. Denote the overlaps between electrode 55 and electrodes 51-54 by A-D, respectively.

Figure 4:
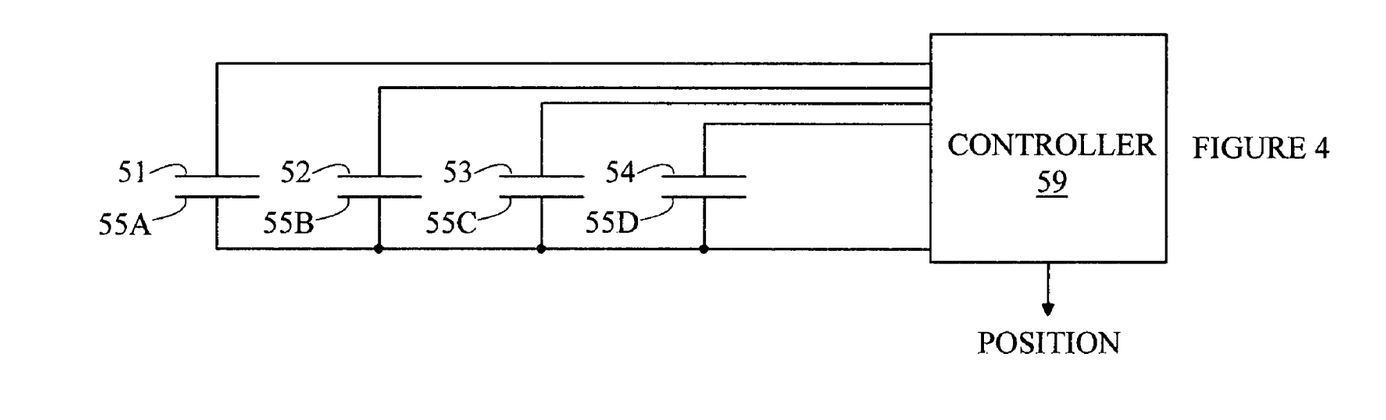
FIG. 4 is a schematic drawing of an equivalent circuit for electrodes 51-55.

Refer now to FIG. 4, which is a schematic drawing of an equivalent circuit for electrodes 51-55. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode. This electrode is electrode 55. Hence, by measuring the capacitance between electrode 55 and each of electrodes 51-54, the position of electrode 55 relative to electrodes 51-54 can be determined. This determination can be made by a controller 59, which may be part of the pointing device or part of the host device of which the pointing device forms a part.

Figure 5:
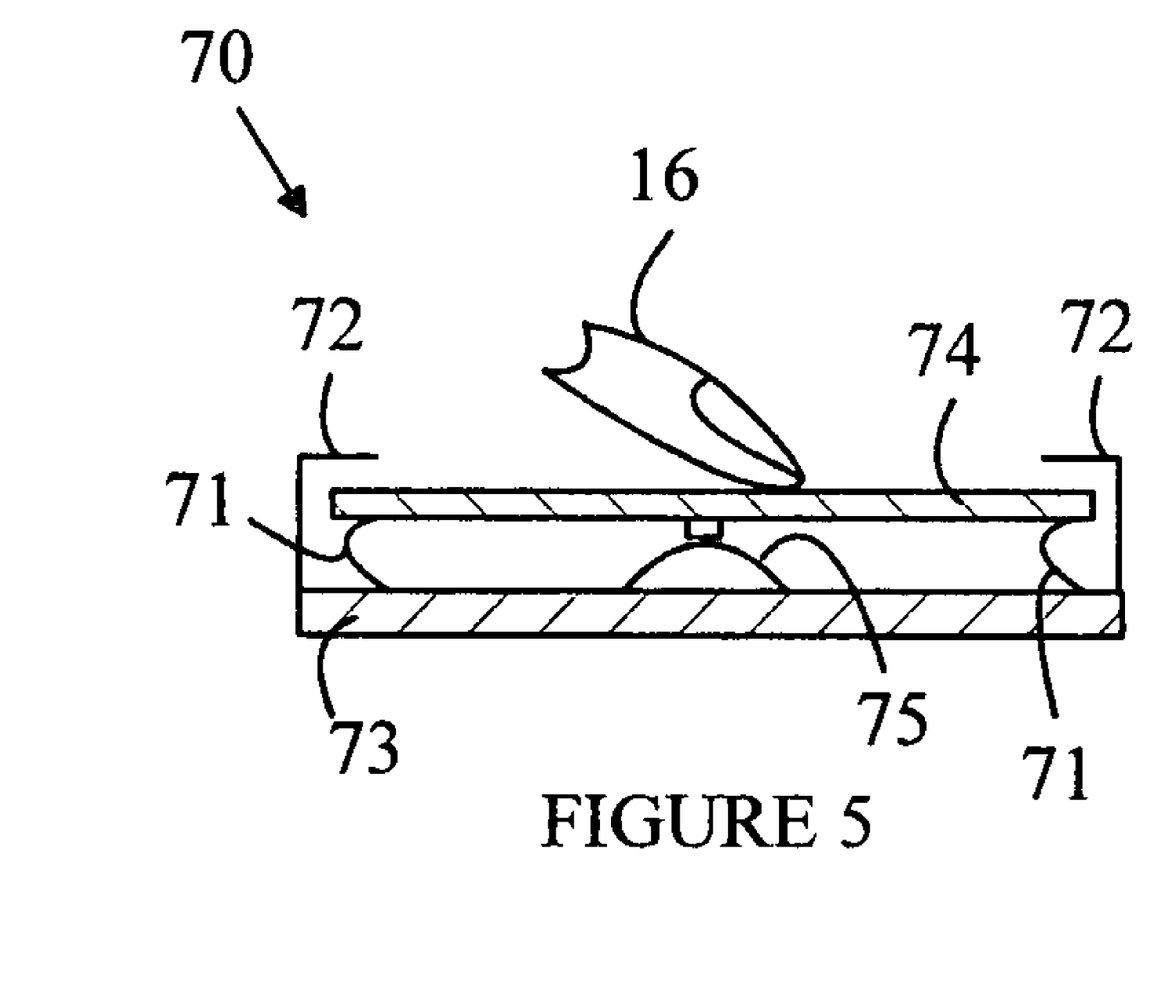
FIG. 5 is a cross-sectional view of a puck 70 that utilizes a clicker.

To implement a "click" for selecting an item at the current cursor location, a dome-shaped clicker can be incorporated in the puck. Refer now to FIG. 5, which is a cross-sectional view of a puck 70 that utilizes such a clicker. Puck 70 has a bottom electrode 73 whose capacitance is used to determine the position of the puck in the field of motion as described above. Puck 70 also includes a top electrode 74 that is depressed when the user presses on the electrode. Top electrode 74 is spring mounted to force that electrode against the detents shown at 72 when the user is not pressing on the electrode. In the embodiment shown in FIG. 5, a number of springs 71 provide this function. The distance between electrodes 73 and 74 can be determined by measuring the capacitance between these electrodes. When the user presses lightly on electrode 74, the electrode moves downward until it reaches the top of clicker 75. If the user presses on electrode 74 with a force greater than some threshold force determined by the physical properties of clicker 75 and springs 71, clicker 75 will snap to a configuration in which the dome is inverted. This will relieve the upward force on electrode 74, and electrode 74 will move closer to electrode 75. This new position can be sensed by measuring the capacitance between electrodes 74 and 75.

The clicker shown in FIG. 5 is constructed from a dome-shaped sheet of material that has a height that changes abruptly when the dome is depressed below a predetermined height. The change in states is accompanied by a change in the force applied upward on electrode 74. This provides the user with a sensation like that obtained when a switch is closed. For the purposes of this application, the term "clicker" is defined to include any mechanical device that changes one of its dimensions in response to a force being applied thereto in which the change in dimension is a non-linear function of the applied force. The preferred class of clicker has a bi-stable dimension that switches abruptly between states when the force applied to the clicker is greater than a first threshold force and reverts to its original state when the applied force falls below a second threshold.

Figure 6A:
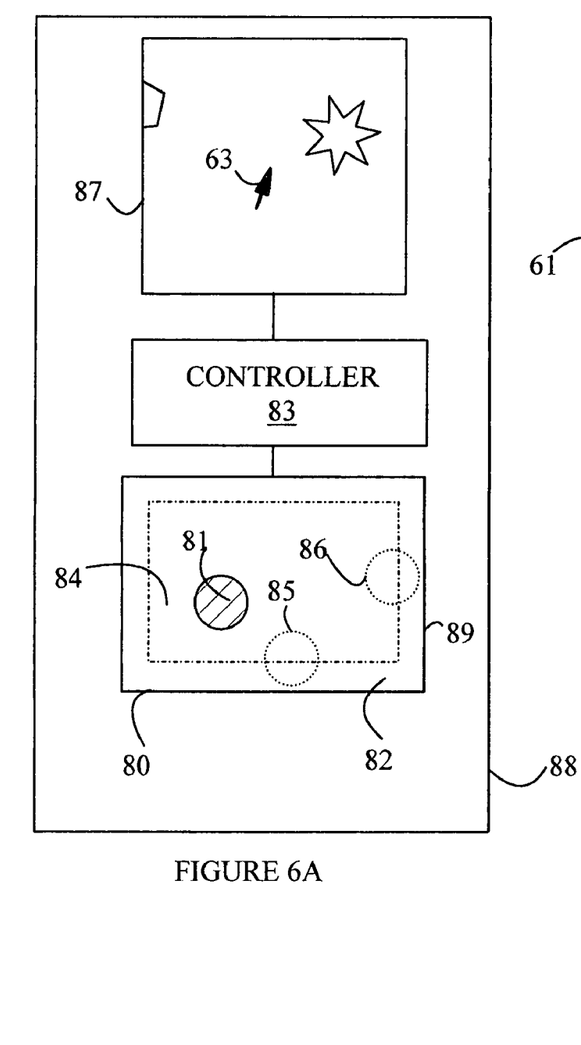
FIG. 6A is a schematic drawing of a handheld device 88 according to one embodiment of the present invention.
Figure 6B:
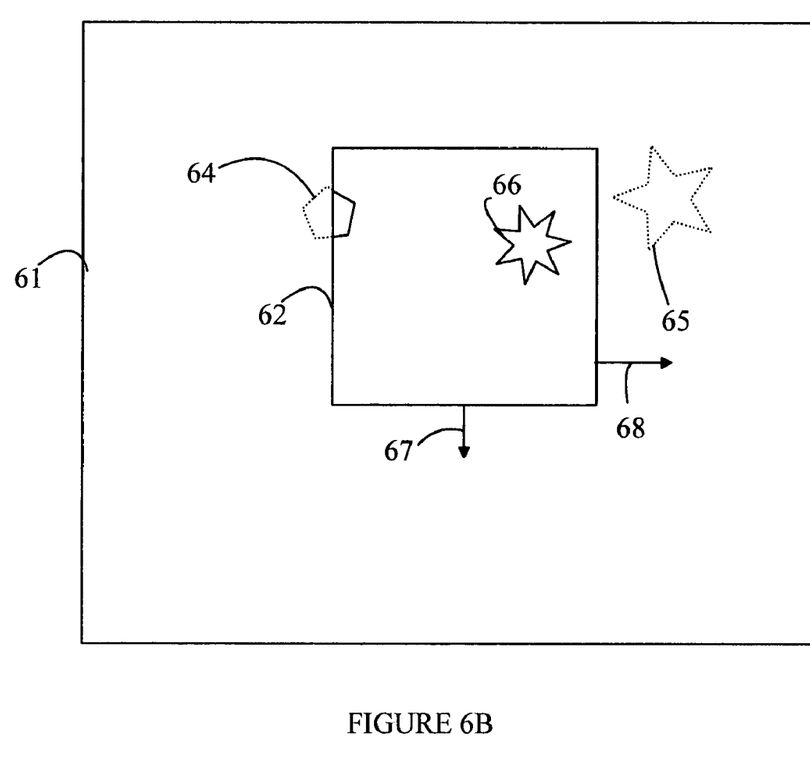
FIG. 6B is a top view of the corresponding desktop and viewing window shown in FIG. 6A.

For the small screens on handheld devices such as PDAs and cellular telephones, it is often possible to map the motion of the puck to the entire screen in a one-to-one fashion, such that each position of the puck corresponds to a fixed cursor position on the screen. Since the amount of information that can be displayed on these limited precision displays is relatively small, some mechanism must be provided to present the information in a series of displays so that the user can navigate through the information using only the limited screen area. The copending application Ser. No. 11/069,341 noted above provides a method and apparatus for easing this navigation process. That method is best understood in terms of an analogy in which the contents of a large desktop are accessed through a small viewing window that is positioned over the top of the desktop. Refer now to FIGS. 6A and 6B. FIG. 6A is a schematic drawing of a handheld device 88 according to one embodiment of the present invention. FIG. 6B is a top view of the corresponding desktop 61 and viewing window 62.

Viewing window 62 corresponds to the display on the handheld device. The portion of desktop 61 under viewing window 62 is displayed to the user on the display of the handheld device. In the example shown in FIG. 6B, the desktop contains a number of objects shown at 64-66. Those objects that are under the viewing window can be seen on the display. Hence, the user of handheld device 88 can see object 66 and the portion of object 64 within on screen 87 of handheld device 88. However, the user cannot see object 65 unless the user repositions viewing window 62 over object 65.

Handheld device 88 includes a pointing device 80 that operates in a manner analogous to that discussed above with respect to the devices shown in FIGS. 1-5. In particular, pointing device 80 includes a puck 81 that moves within a field of motion 82. The position of puck 81 within field of motion 82 is sensed by controller 83 and used to control both the position of cursor 63 and the position of window 62 within the boundary of desktop 61. It will also be assumed that puck 81 includes a pressure sensing mechanism such as that described above that is monitored by controller 83. When the user engages the pressure mechanism by pressing on puck 81, the controller notes the position of cursor 63 and uses that position to perform a predetermined action, such as selecting the object under the cursor. The pressure mechanism may also include a clicker as described above to provide feedback to the user.

When puck 81 is within region 84 of field of motion 82, the controller moves cursor 63 within view screen 87. The position of cursor 63 within view screen 87 is determined by the position of puck 81 within region 84. Controller 83 includes a one-to-one mapping that specifies the position of cursor 63 for each location of puck 81 in region 84. This mapping is preferably linear.

When the user moves puck 81 to a position outside of region 84, the coupling between the puck position and the position of cursor 63 is broken. In this region, window 62 is caused to move in a direction determined by the position of puck 81. For example, controller 83 can be programmed to implement a scroll function in which window 62 moves in the direction shown at 68 on the desktop when the puck is moved to position 86. In this embodiment, the window will continue to move in this direction until the user moves puck 81 back into region 84. In one embodiment, the window moves at a predetermined constant speed. In another embodiment, the speed is increased as a function of the distance between the puck and wall 89. Similarly, if the puck is moved to position 85, window 62 would move in the direction shown by arrow 67, and so on. A diagonal motion of the window can be implemented when the puck is in the corresponding corner of field of motion 82.

Figure 7:
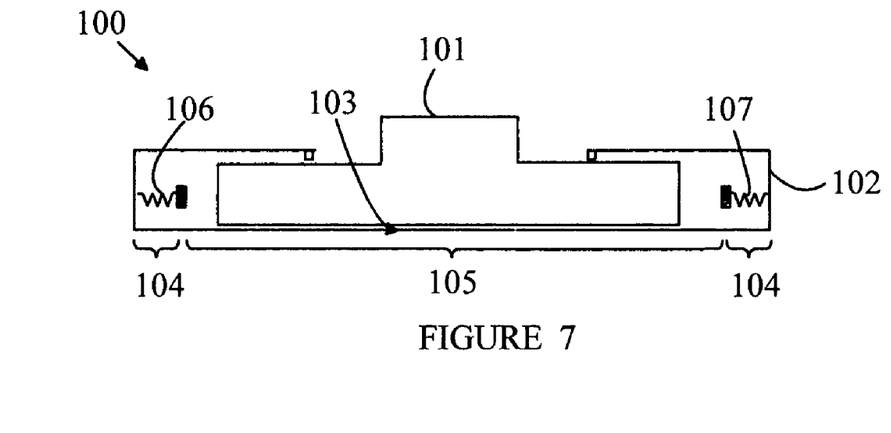
FIG. 7 is a cross-sectional view of a pointing device 100 according to one embodiment of the present invention.

Since the functions implemented by the pointing device change abruptly when the puck moves outside of region 84, a mechanism that reduces the probability that the user will change the function inadvertently is desirable. Refer now to FIG. 7, which is a cross-sectional view of a pointing device 100 according to one embodiment of the present invention. Pointing device 100 includes a puck 101 that moves within a field of motion defined by a boundary wall. To simplify the drawing, the electrodes that sense the position of the puck over surface 103 have been omitted.

The field of motion is divided into two regions: the region shown at 105 and an annular region shown at 104 surrounding region 105. The area of the field of motion nearest to wall 102 is used for selecting functions such as the scroll operation discussed above. The region 105 in the center of the field of motion is used for the conventional pointing operation in which the cursor is mapped to a location that is determined by the puck position in this area. To prevent the user from inadvertently moving the puck into region 104, a deformable boundary is placed at the junction of regions 104 and 105 as shown schematically by springs 106 and 107. To move the puck into region 104, the user must apply sufficient lateral pressure on puck 101 to compress the springs so that the puck can enter region 104. In normal pointing mode, the lateral force applied by the user to move the puck is much less than that needed to compress the springs, and hence, the user is less likely to switch pointing functions without making a conscious effort. By preloading the boundary springs with an initial compression, the distinction between the two regions can be heightened.

Figure 8:
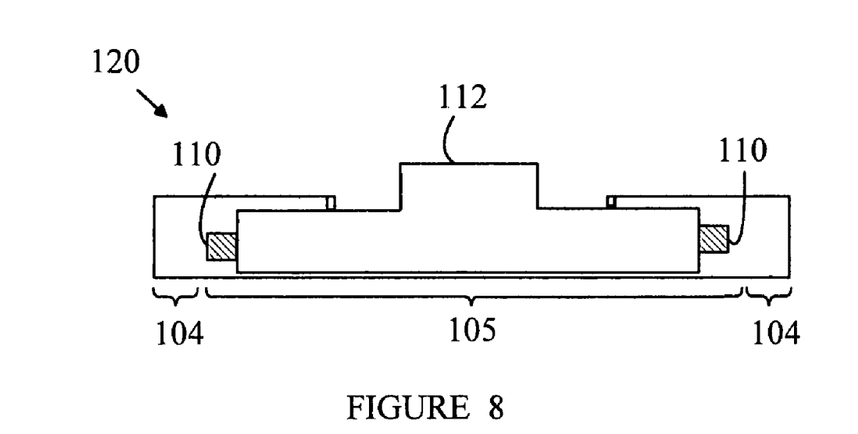
FIG. 8 is a cross-sectional view of another embodiment of a pointing device.

While the above-described embodiment utilizes springs attached to a wall to change the lateral force that must be applied to the puck to move the puck into region 104, other mechanisms can be utilized. Refer now to FIG. 8, which is a cross-sectional view of another embodiment of a pointing device 120. Puck 112 includes a ring 110 of resilient material such as foam rubber that must be compressed to move the puck into region 104.

In the embodiments discussed above with reference to FIGS. 6A and 6B, the user can only view the portion of the desktop that is currently under the window. This makes it difficult for the user to determine in which direction to scroll the window. Either the user must remember the contents of the desktop in the hidden locations or the user must use a hit or miss strategy to reposition the window over a desired region that is not currently in view. The present invention provides a mechanism for facilitating the repositioning of the window without requiring the user to remember the contents of the hidden regions on the desktop.

Figure 9A:
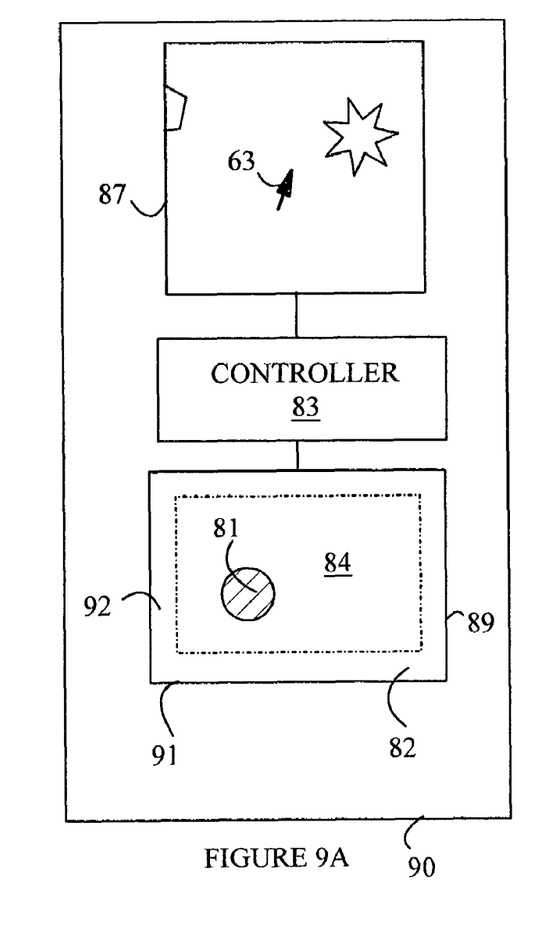
FIG. 9A illustrates device 90 that is similar to device 88 shown in FIGS. 6A-6B.

The manner in which the present invention provides its advantages can be more easily understood with reference to FIGS. 9A-9D, which illustrate a handheld device 90 according to one embodiment of the present invention. Refer now to FIG. 9A. Device 90 is similar to device 88 shown in FIGS. 6A-6B, in that device 90 includes a pointing device 91 having a puck 81 that moves in a field of motion 82. Field of motion 82 is divided into a central pointing region 84 and a boundary region 92. Device 90 also includes a view screen 87 having a cursor 63 whose position is controlled by the position of puck 81 when puck 81 is in pointing region 84. The position of puck 81 is sensed by controller 83 in a manner analogous to that described above.

Figure 9B:
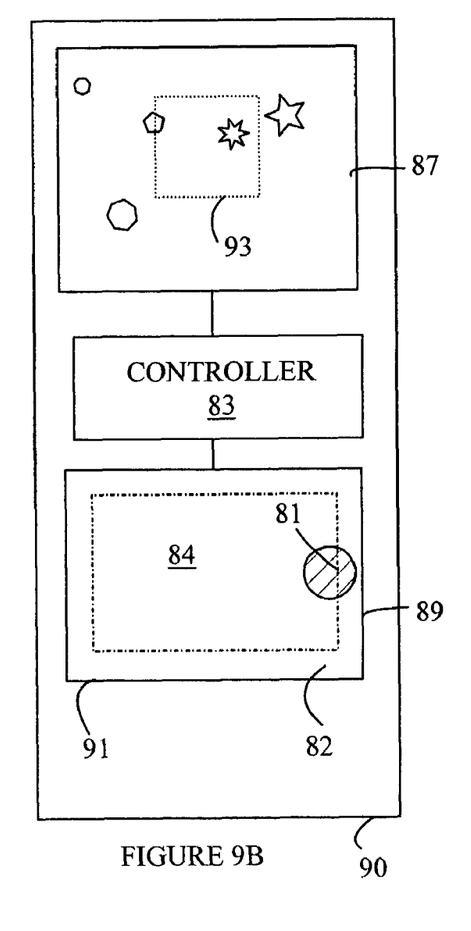
FIG. 9B is a view of the desktop under the window of device 90 illustrating the current position of the window shown thereon.

Pointing device 90 also implements a desktop model in which view screen 87 displays the portion of the desktop that is under a window. The position of the window is set by forcing puck 81 against one or two of the walls of the field of motion. Refer now to FIG. 9B. When puck 81 enters boundary region 82, controller 83 switches the scene shown on view screen 87 from a view of the desktop under the window to a view of the entire desktop with the current position of window 93 shown thereon. If the user moves the puck against one of the walls, window 93 will move in a corresponding direction on the view screen so that the user can move the window to the desired portion of the desktop.

Figure 9C:
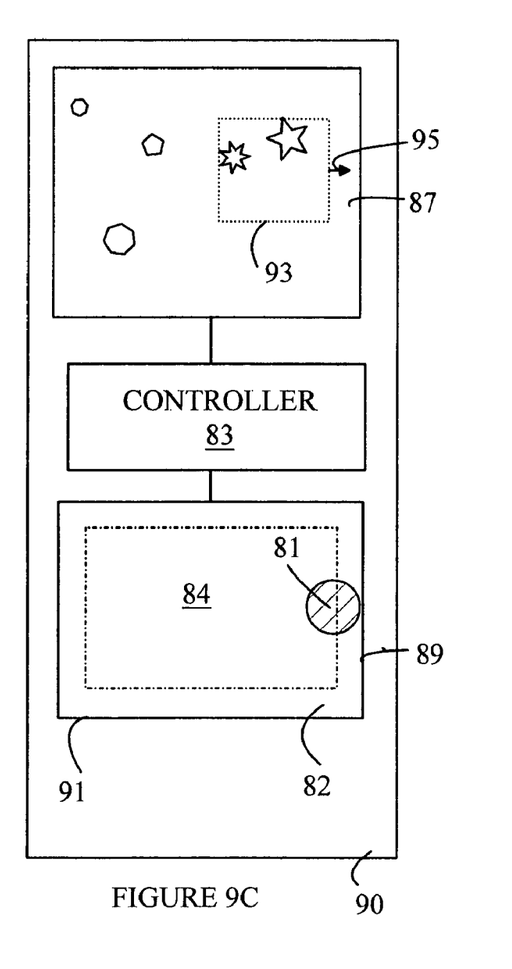
FIG. 9C shows the new window position after the puck has been held against the wall for some period of time.

FIG. 9C shows the new window position after puck 81 has been held against wall 89 for some period of time. The rate at which window 93 moves over the desktop can be controlled by the position of puck 81 relative to wall 89. For example, if the user presses the puck harder against wall 89, the resilient member or spring described above will be compressed further, and puck 81 will move closer to wall 89. The distance between puck 81 and wall 89 is sensed by controller 83, which, in turn, increases the speed with which window 93 moves in the direction shown by arrow 95. The harder the user presses the puck against the wall, the faster the window moves.

In one embodiment, the window motion direction is selected from 8 possible directions corresponding to puck 81 being forced against each of the four walls of the field of motion or each of the four corners. Pressing the puck against a wall causes the window to move in a horizontal or vertical direction corresponding to the wall in question. Pressing the puck into a corner causes the window to move in a corresponding diagonal direction.

Figure 9D:
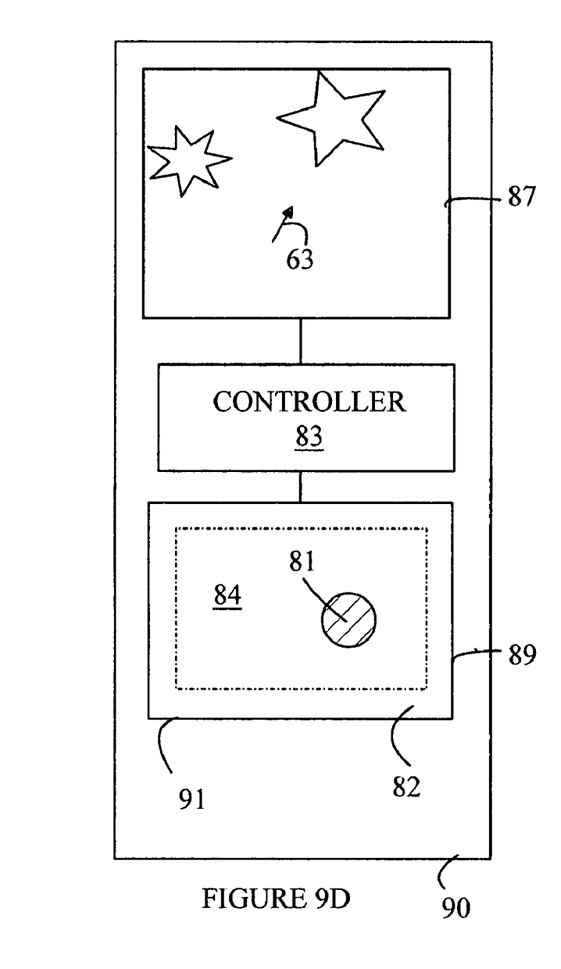
FIG. 9D illustrates the view screen displaying the region of the desktop under the current window location.

Refer now to FIG. 9D. When the user once again returns puck 81 to pointing region 84 of field of view 82, controller 83 returns view screen 87 to the mode in which the view screen displays just the region of the desktop under the current window location. The cursor is also once again displayed at a location corresponding to the position of puck 81 in pointing region 84.

In the above-described embodiments, the portion of the desktop that is displayed on the view screen changes abruptly when the puck enters the function region in the field of motion. For the purposes of this discussion, the zoom factor will be defined to be the ratio of the desktop area to the area displayed on the view screen. In effect, the previously described embodiments utilize a display scheme in which the zoom fact changes abruptly. Such abrupt changes can cause problems for some users.

Figure 10A:
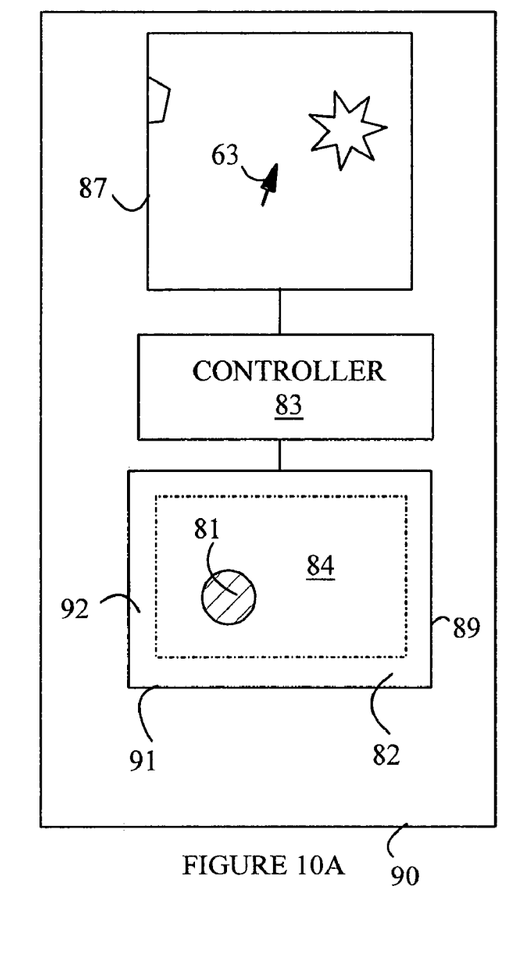
FIGS. 10A-10E illustrate an embodiment of the present invention in which the zoom factor changes gradually.
Figure 10B:
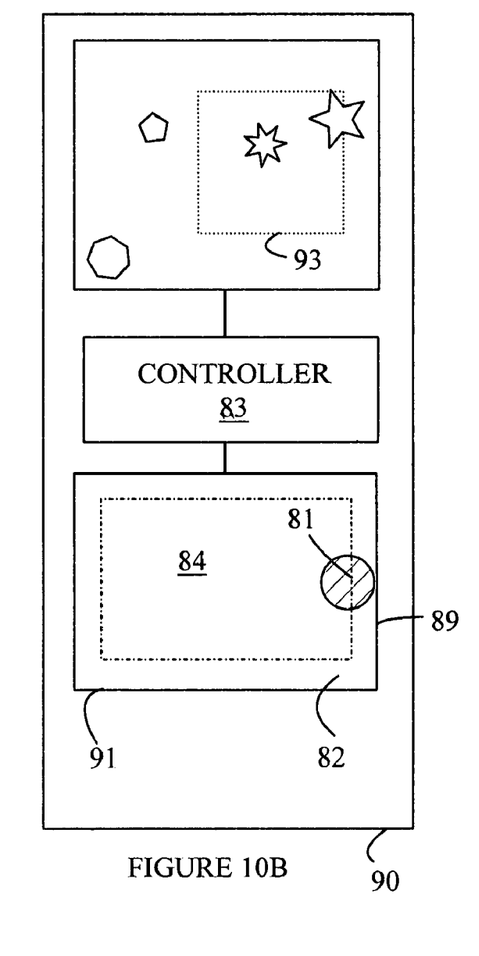
Figure 10C:
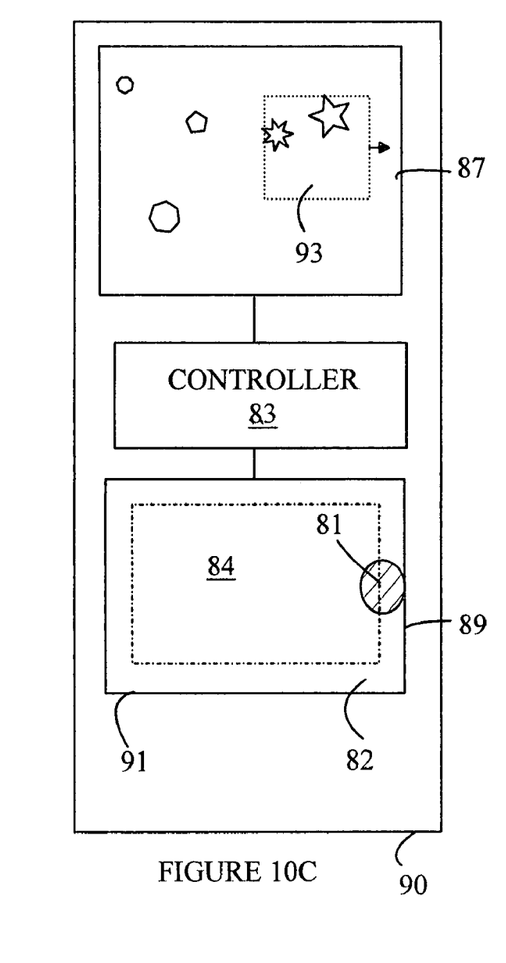
Figure 10D:
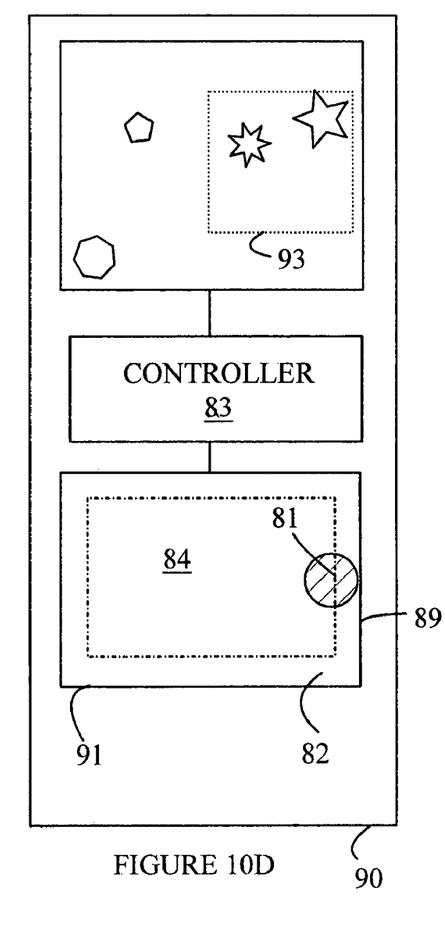
Figure 10E:
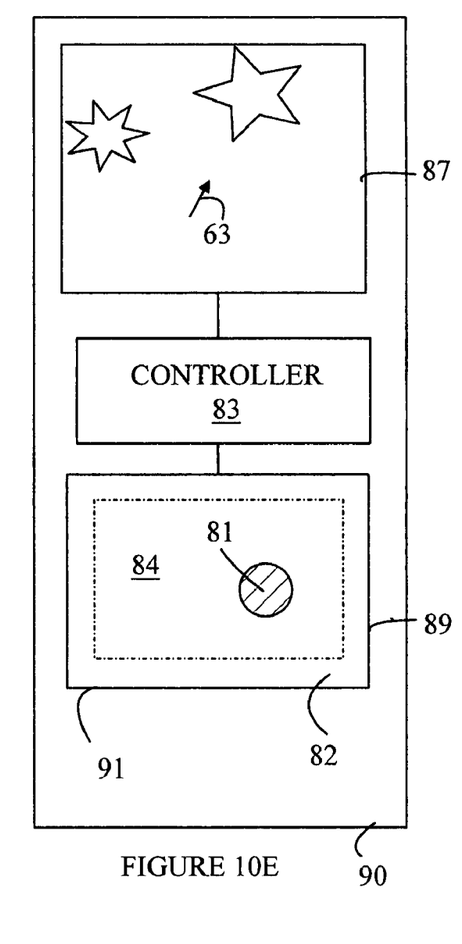

Refer now to FIGS. 10A-10E, which illustrate an embodiment of the present invention in which the zoom factor changes more gradually. The process begins with puck 81 in the pointing region of the field of motion as shown in FIG. 10A. As the user moves puck 81 into the function region as shown in FIG. 10B, the view screen zoom factor decreases and a portion of the desktop around the current window 93 is also displayed. As the user pushes puck 81 harder against wall 89, the resilient bumper around the cursor deforms further and the zoom factor decreases further and the window begins to move sideways as shown in FIG. 10C. When the window has reached the desired position, the user begins to reduce the force on puck 81, and the zoom factor increases. The motion of the window also decreases, finally coming to a stop as shown in FIG. 10D. When the user then returns the puck to the pointing region, the zoom factor is set to its maximum value, and the cursor returns to the screen at a position determined by the position of the puck in the pointing region as shown in FIG. 10E.

Figure 11A:
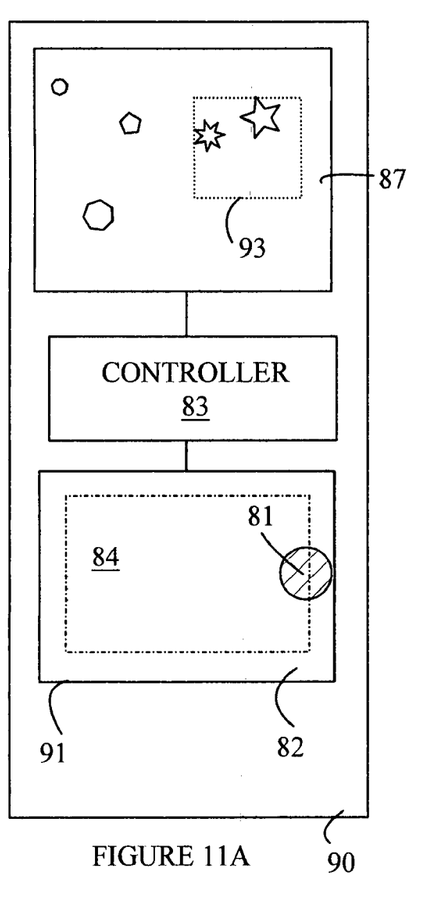
FIGS. 11A-11C illustrate an embodiment of the present invention in which the zoom factor associated with the view screen does not return to the value associated with the puck in the pointing region until the puck is well within the pointing region.
Figure 11B:
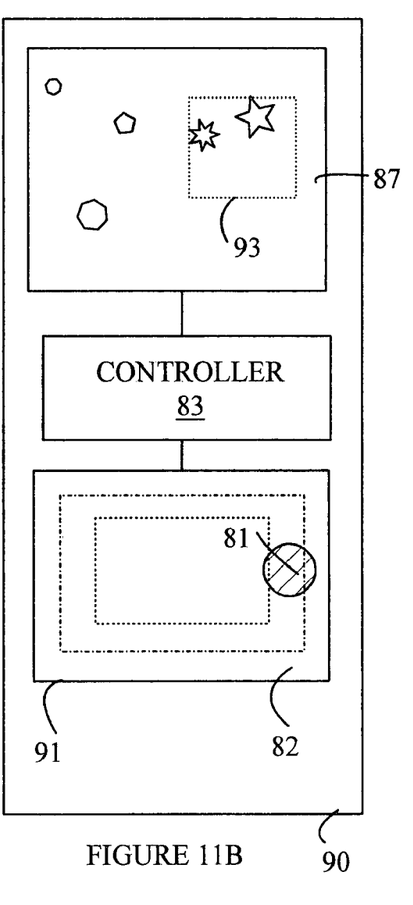
Figure 11C:
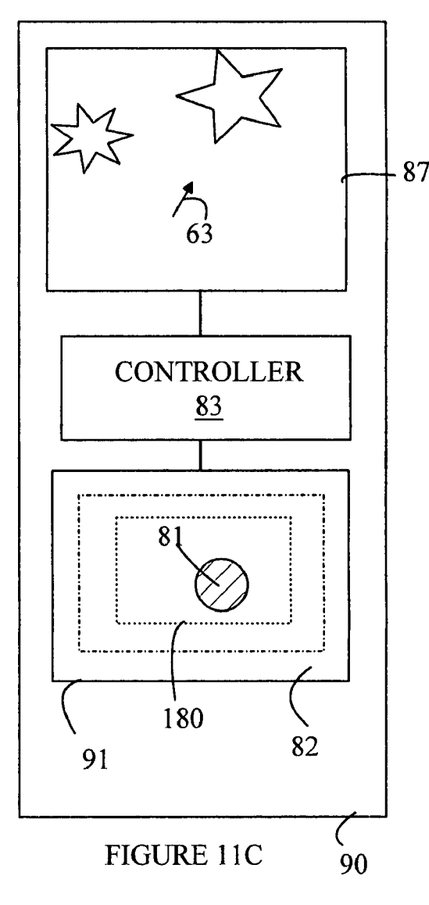

In another embodiment, the problem of the zoom factor switching back and forth quickly is reduced by introducing hysteresis into the zoom mechanism. When the puck is just at the boundary of the function zone, the user can move the puck in and out of the function zone unintentionally by inadvertently applying or relieving a small force on the puck. Once again, this can lead to the scene on the view screen changing back and forth between two scenes that are markedly different because the relevant zoom factors associated with those scenes are significantly different. Refer now to FIGS. 11A-11C, which illustrate an embodiment of the present invention in which the zoom factor associated with the view screen does not return to the value associated with the puck in the pointing region until the puck is well within the pointing region. To simplify the following discussion, it will be assumed that there are only two zoom factors in this embodiment. The first is associated with the point region, and the second is associated with the function region. FIG. 11A illustrates the view screen when the puck is within the function region and the zoom factor is set to 1, i.e., the entire desktop is presented on view screen 87. When the puck is moved from the function region to a region that is outside of the function region, but also outside of region 180, the zoom factor remains at 1, as shown in FIG. 11B. When the user finally moves the puck to within region 180 the zoom factor switches back to the zoom factor associated with the pointing region as shown in FIG. 11C. The zoom factor will remain at this value until the puck again enters the function region. Hence, the rapid switching of the zoom factor discussed above is eliminated. The point at which the zoom factor switches can be specified by a distance from the field of motion wall. For example, when the puck returns to a position that is at least one puck diameter within the pointing region, the zoom factor would switch back to the zoom factor that is associated with the pointing region.

In the embodiments described above, the display has two modes. In the first mode, the pointing region occupies all of the view screen, and in the second mode, the desktop occupies the entire screen area. For some handheld devices, the field of motion of the puck is very limited due to space constraints. For the purposes of this discussion, the mechanical gain of the point system is defined to be the ratio of the area of the screen to the area of the puck field of motion. If the mechanical gain is too high, the cursor will jump around on the view screen, since there is a limit to the precision with which the user can move the puck from one location to another in the field of motion. Hence, if the view screen is too large compared to the puck field of motion, the user will have difficulty positioning the cursor on the screen. In such cases, this problem can be overcome by limiting the mechanical gain to a predetermined maximum value. As a result, the pointing region will not occupy the entire view screen in first mode.

Refer now to FIG. 12, which illustrates a handheld device according to another embodiment of the present invention. Handheld device 100 has a puck 102 that moves in a field of motion 103. The mechanical gain of the pointing system is restricted to a value such that the view screen is larger than the cursor travel area corresponding to field of motion 103, and hence, the pointing region 101 on screen 105 is smaller than the entire view screen. In one embodiment, a boundary is displayed on screen 105 to indicate the region that can be reached by moving puck 102 in the pointing region 108 of the field of motion. In the embodiment shown in FIG. 12, the portion of desktop 109 in the areas surrounding the area that is within region 101 is displayed in the remainder of the view screen at the same magnification as the area of the desktop that is within region 101. However, embodiments in which a different magnification is used in region 109 can also be constructed. For example, the magnification in this area could be varied such that the entire desktop is displayed in a manner similar to the view that would be seen through a "fisheye" lens. In this case, the magnification would be variable and would increase in a continuous manner from the boundary of region 101 to the edge of view screen 105.

In the above-described embodiments of the present invention the puck is confined to a rectangular field of motion. However, it is to be understood that the field of motion can have an arbitrary boundary shape. For example, the field of motion can be circular or oval shape.

Various modifications to the present invention will become apparent to those skilled in the art from the foregoing description and accompanying drawings. Accordingly, the present invention is to be limited solely by the scope of the following claims.

What is claimed is:

1. A display device, comprising:
a first surface having a puck field of motion defined thereon, said puck field of motion being divided into a pointing region and a function region;
a moveable puck that moves on said first surface, said puck being characterized by a position within said field of motion;
a controller that determines a position of said puck within said field of motion; and
a display screen having first and second display modes, said display screen displaying a two-dimensional scene in said first display mode and a first sub-scene of said two-dimensional scene in said second display mode, said first sub-scene being an enlarged view of a portion of said two-dimensional scene, said first sub-scene being characterized by a sub-scene position within said two-dimensional scene, said display screen further displaying a cursor that moves within said first sub-scene in a manner controlled by said position of said puck when said puck is in said pointing region in said second display mode,
wherein said controller causes said display screen to change from said second display mode to said first display mode when said puck enters said function region to switch from displaying said first sub-scene on said display screen to displaying said two-dimensional scene on said display screen and wherein said controller causes said display screen to change from said first display mode to said second display mode when said puck returns to said pointing region to switch from displaying said two-dimensional scene on said display screen to displaying said first sub-scene on said display screen.

2. The display device of claim 1 wherein a boundary of said sub-scene is displayed in said two-dimensional scene in said first display mode.

3. The display device of claim 1 wherein said controller causes said sub-scene position to move in response to the position of said puck in said function region.

4. The display device of claim 1 further comprising a deformable barrier for inhibiting the movement of said puck into said function region, said inhibition being overcome by a user applying a force to said puck in a direction parallel to said first surface.

5. The display device of claim 1 wherein said field of motion further comprises a zoom switch region located within said pointing region and wherein said controller causes said display screen to change from said first display mode to said second display mode when said puck moves from said function region into said zoom switch region.

6. The display device of claim 1 wherein said display screen further comprises a third display mode in which said display screen displays a second sub-scene that contains said first sub-scene, wherein said controller causes said display screen to change from said second display mode to said third display mode when said puck is in a first portion of said function region, and wherein said controller causes said display screen to change from said third display mode to said first display mode when said puck is in a second portion of said function region.

7. The display device of claim 1 wherein said cursor is restricted to moving within a sub-scene of said first sub-scene.

8. A method for inputting data to a device having a display screen thereon, said method comprising:
- providing a moveable puck that moves within a field of motion on a surface, said puck being characterized by a position within said field of motion;
- dividing said field of motion into a pointing region and a function region;
- providing a moveable puck confined to move on said first surface;
- displaying a first two-dimensional scene on said display screen when said puck is in said pointing region and a second two-dimensional scene when said puck is in said function region, said first two-dimensional scene being a first sub-scene within said second two-dimensional scene characterized by a sub-scene position, said first two-dimensional scene being an enlarged view of a portion of said second two-dimensional scene;
- switching from displaying said first sub-scene on said display screen to displaying said second two-dimensional scene on said display screen when said puck enters said function region; and
- switching from displaying said second two-dimensional scene on said display screen to displaying said first sub-scene on said display screen when said puck returns to said pointing region.

9. The method of claim 8 further comprising displaying a cursor in said first two-dimensional scene, said cursor being located at a position within said first two-dimensional scene determined by said position of said puck in said pointing region.

10. The method of claim 8 wherein said boundary of said first two-dimensional scene is displayed in said second two-dimensional scene.

11. The method of claim 8 wherein said sub-scene position moves in response to said position of said puck in said function region.

12. The method of claim 8 further comprising displaying said second two-dimensional scene when said puck moves from said function region into said pointing region to a region outside of said zoom region that is part of said pointing region and then displaying said first two-dimensional scene when said puck moves into said zoom region.

13. The method of claim 8 further comprising displaying a third two dimensional scene comprising a second sub-scene that contains said first sub-scene, when said puck is in a first portion of said function region, and changing from said third two-dimensional scene to said first two-dimensional scene when said puck moves from said first portion of said function region to a second portion of said function region.

* * * * *